M. G. CLINE & J. A. MARTIN.
STALK CUTTER.
APPLICATION FILED JAN. 15, 1916.
1,203,490.
Patented Oct. 31, 1916.
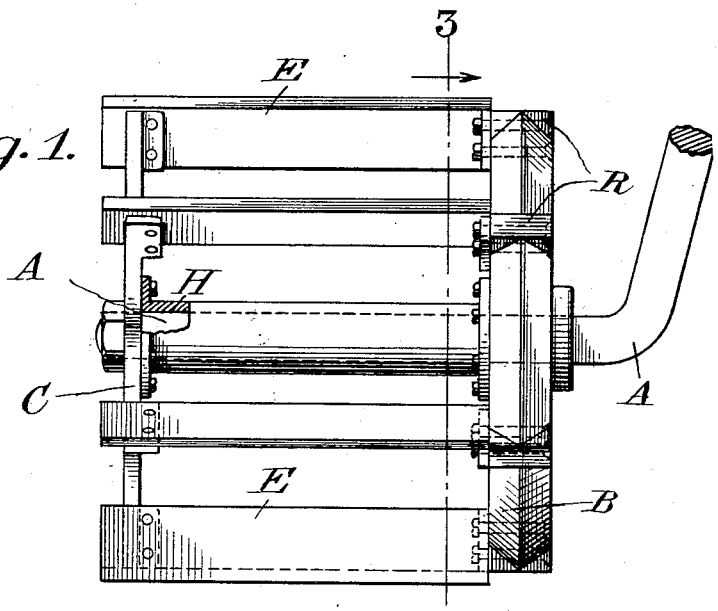
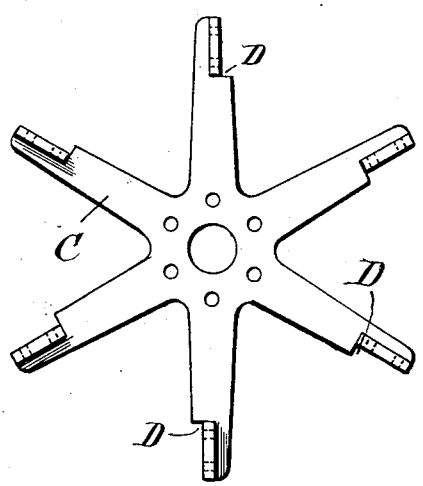
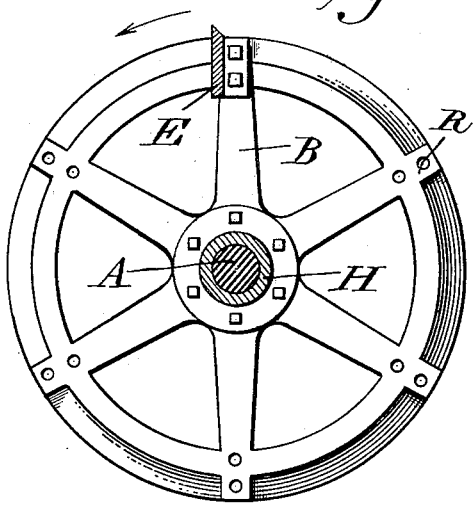
Witnesses
Fenton S. Belt
J. W. Sherwood
Inventors
M. G. Cline and
J. A. Martin
By Frank H. Hough
Attorney

UNITED STATES PATENT OFFICE.

MILTON GREEN CLINE AND JADIE ARTHUR MARTIN, OF GOLDTHWAITE, TEXAS.

STALK-CUTTER.

1,203,490.  Specification of Letters Patent.  Patented Oct. 31, 1916.

Application filed January 15, 1916. Serial No. 72,287.

*To all whom it may concern:*

Be it known that we, MILTON G. CLINE and JADIE A. MARTIN, citizens of the United States, residing at Goldthwaite, in the county of Mills and State of Texas, have invented certain new and useful Improvements in Stalk-Cutters; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stalk cutters adapted for attachment to wheeled plows and consists in the provision of a simple and efficient device of this nature so arranged that it may be clamped or otherwise secured to the wheel of a plow and cut the stalks as the plow moves over the field.

The invention comprises various details of construction, combinations and arrangements of parts which will be hereinafter fully described, shown in the accompanying drawings and then specifically defined in the appended claims.

Our invention is illustrated in the accompanying drawings, in which:

Figure 1 is a side elevation of our stalk cutter, part being shown in section. Fig. 2 is an end view, and Fig. 3 is a section on line 3—3 looking in the direction of the arrow.

Reference now being had to the details of the drawings by letter, A designates an axle forming a part of the frame of a wheeled plow and a projecting portion of said axle forms a spindle upon which the shell H is journaled, which latter is provided with flanges, bolted or otherwise secured to the spider wheel C. The spider wheel has recesses D, (see Fig. 2) and E are cutter plates bolted in said recesses, having their outer edges beveled and projecting circumferentially beyond the marginal edges of said spider wheel.

The plow wheel B has its V-shaped periphery alternated by lugs R which give a flat vertical surface for attachment to the bent ends of the blades and through which lugs the attaching bolts extend.

In operation, when the wheeled plow is rotated, the cutters will rotate therewith, cutting the stalks preparatory to their being plowed underneath by the plow as it follows.

By the provision of a stalk cutter embodying the features of our invention, it will be noted that a simple and efficient device is provided which may be attached to an ordinary wheeled plow and affords means whereby, at one operation of the plow, the ground may be cleared of the stalks and the same plowed underneath the ground.

What we claim to be new is:

1. The herein described device comprising a plow wheel, its axle, the latter having an extension forming a spindle, a shell journaled on said spindle, a spider wheel having recesses, cutter plates extended beyond the marginal edge of said spider wheel, said cutter plates having bent inner ends, bolts engaging said bent inner ends and connecting the same to the plow wheel, said cutter plates being seated in said recesses, and bolts connecting said cutter plates to the spider wheel.

2. The herein described device comprising a plow wheel, its axle, the latter having an extension forming a spindle, a shell journaled on said spindle, a spider wheel secured to the outer end of said shell, cutter plates secured to the spider wheel and having bent inner ends, said plow wheel having a V-shaped periphery alternated by lugs forming flat vertical faces, and bolts passed through said lugs and bent ends for attaching said plates in position.

In testimony whereof we hereunto affix our signatures, in presence of two witnesses, this 10th day of January, A. D. 1916.

MILTON GREEN CLINE.
JADIE ARTHUR MARTIN.

Witnesses:
G. R. MOXLEY,
J. B. SULLIVAN.

Copies of this patent may be obtained for five cents each, by addressing the "Commissioner of Patents, Washington, D. C."